United States Patent [19]

Foreman

[11] Patent Number: 4,491,523

[45] Date of Patent: Jan. 1, 1985

[54] METHOD FOR TREATING BARIUM TOXIC WATER USING LOW-TEMPERATURE STABILIZED POLYACRYLAMIDE COMPOSITIONS

[75] Inventor: Robert W. Foreman, Bloomfield Hills, Mich.

[73] Assignee: Park Chemical Company, Detroit, Mich.

[21] Appl. No.: 479,421

[22] Filed: Mar. 28, 1983

Related U.S. Application Data

[63] Continuation-in-part of Ser. No. 276,857, Jun. 24, 1981, abandoned.

[51] Int. Cl.³ .............................. C02F 5/10; C02B 1/20
[52] U.S. Cl. .................................. 210/728; 252/175; 252/180; 252/181; 210/734
[58] Field of Search ............... 210/705, 685, 723, 728, 210/734; 252/175, 180, 181

[56] References Cited

U.S. PATENT DOCUMENTS

| | | | |
|---|---|---|---|
| 3,066,095 | 11/1962 | Hronas | 210/728 |
| 3,184,336 | 5/1965 | Murphy | 134/22 |
| 3,285,849 | 11/1966 | Watanabe et al. | 210/728 |
| 3,493,500 | 2/1970 | Volk et al. | 210/734 |
| 3,655,552 | 4/1972 | Flock et al. | 210/728 |
| 3,658,772 | 4/1972 | Volk et al. | 210/734 X |
| 3,827,977 | 8/1974 | Miles et al. | 252/8.55 B |
| 3,860,526 | 1/1975 | Corbett | 252/181 |
| 4,089,796 | 5/1978 | Harris et al. | 252/181 |
| 4,237,090 | 12/1980 | De Monbrun et al. | 422/13 |
| 4,277,359 | 7/1981 | Lipinski | 252/181 |
| 4,397,748 | 8/1983 | Argabright et al. | 210/733 |

FOREIGN PATENT DOCUMENTS

| | | |
|---|---|---|
| 696780 | 10/1964 | Canada . |
| 15277 | 2/1978 | Japan . |
| 140275 | 12/1978 | Japan . |
| 73464 | 6/1979 | Japan . |

*Primary Examiner*—Prince E. Willis
*Attorney, Agent, or Firm*—Krass & Young

[57] ABSTRACT

Aqueous compositions for the treatment of barium-toxic waste waters are provided. The compositions, which are storage stable at freezing temperatures, include ammonium sulfate and an agent for in situ coagulation of non-ionic barium in the form of environmentally safe solid phase particulates.

4 Claims, No Drawings

METHOD FOR TREATING BARIUM TOXIC WATER USING LOW-TEMPERATURE STABILIZED POLYACRYLAMIDE COMPOSITIONS

REFERENCE TO RELATED APPLICATION

This application is a continuation-in-part of my co-pending application Ser. No. 276,857, filed June 24, 1981, now abandoned.

TECHNICAL FIELD

This invention relates to the treatment of waster waters for purposes of environmental safety and more particularly relates to compositions for the treatment of barium-toxic waste waters.

BACKGROUND OF THE INVENTION

Waste waters entering the environment from industrial operations, metal treating, mining, and the like are commonly subject to contamination by various undesirable ionic substances. Waste waters containing ionic barium, for example, must be treated with soluble sulfate before they can be allowed, substantially free of barium, to enter ground waters or rivers (see, for instance, James et al, Water Treatment, page 204, CRC Press, 3rd Ed., Cleveland, 1966). Barium is not a common contaminant of water. However, a concentration in excess of one part per million (ppm) is objectionable because of the seriousness of the toxic effects of barium on the heart function, blood vessels, and nerves (Zajic, Water Pollution, Disposal and Reuse, page 13, Marcel Dekker Inc., New York, 1971). Chemical compositions used for treating waste waters are ordinarily made up in concentrate form and in this form are dispenser-packaged and kept in stock until ready for use. However, in the case of aqueous concentrates kept in stock for long periods, the same often undergo freezing and thawing, crystallizing, oxidation, settling out, etc.

It is therefore an object of the present invention to provide storage stable aqueous compositions for the treatment of barium-toxic waste waters.

It is another object of the invention to provide aqueous compositions of the type described which are storage stable in cold weather, even at temperatures below the freezing point of water, i.e., 32 degrees F.

These and other objects, features and advantages will be apparent from the following description and claims.

SUMMARY AND DETAILED DESCRIPTION

Briefly stated, the invention concerns a non-viscous aqueous composition containing ionic sulfate for the treatment of barium-toxic waste waters. The term "non-viscous" as applied to the aqueous composition of the invention means that the composition is an aqueous liquid having substantially the same viscosity as water alone. The composition in particular comprises in solution ammonium sulfate and a water miscible agent for coagulation or flocculation of non-ionic barium in the form of non-toxic or environmentally safe solid-phase particulates, the ammonium sulfate being present in a concentration such that the composition is storage stable at temperatures below 32 degrees F. The composition of the invention is particularly useful for the precipitation and removal of barium chloride from waste water by a batch procedure using simple equipment as will be presently described. As used herein, the term "barium-toxic waste waters" refers to waters which contain soluble barium in a concentration appreciably more than one part per million; in fact, the concentration of barium chloride in wash/waste water from some sources such as metal heat treating plants typically may be in the range of 0.1–1.5% by weight. In a preferred form, the composition of the invention may contain a rust preventative or anti-oxidant such as sodium nitrite, sodium borate (borax), triethanolamine, oxidized petrolatum (e.g., ALOX 1843 available from ALOX Corporation) and the like. The amount of ammonium sulfate used in the composition is subject to considerable variation. In general, one uses an amount which is soluble over a wide temperature range and sufficient to enable prompt settling out of barium (as insoluble sulfate) in waters treated with the composition. A preferred range of concentration is about 15% to about 40% by weight of ammonium sulfate, a concentration of about 20% by weight being used for best results. When mixed with waste water, the coagulation agent or flocculant present in the subject composition serves in situ to convert or coagulate the resulting barium sulfate precipitate from what would be an ultrafine nonfilterable particulate into a solid form which is sufficiently large that it quickly settles and can be readily separated (for safe disposal) as an acid insoluble solid waste, as by decanting, centrifugation, and/or filtering. For this purpose, the choice of coagulant is not critical. Any of a wide variety of coagulants and flocculant preparations are suitable. Polyacrylamide polymer is used in a concentration of at least 5 ppm. Preferred coagulants which are commercially available are, for example, Hercofloc ® 831.2 and 847, supplied by Hercules Inc., Wilmington, DE 19899; also Nalco ® 7763, 7744-A, and 8800 and Nalcolyte ® 607 and 670, supplied by Nalco Chemical Co., Oak Brook, IL 60251; for a comprehensive list of suppliers, see Chemical Week 1970 Buyers Guide, page 484, McGraw-Hill, New York.

The invention in another preferred aspect concerns the method of treating barium-toxic waste water comprising mixing an aqueous composition according to the invention with the waste water in an amount sufficient to enable prompt settling out of barium as solid phase particulates in the thus treated water and separating the particulates from the water as solid waste.

The invention is illustrated by the following examples.

EXAMPLE 1

Fifteen gallons of an aqueous 20% ammonium sulfate composition for treating barium-toxic waste water are made up in three 5-gallon portions each of which is formulated from the following components listed in the order of addition:

|  | Grams | Parts by Weight |
|---|---|---|
| Water | 17351.40 | 78.87 |
| Rust inhibitor: | | |
| NaNO$_2$ | 151.36 | 0.69 |
| Na borate.10 H$_2$O | 65.12 | 0.30 |
| Coagulant, polyacrylamide polymer (Hercofloc 831.2) | 32.34 | 0.15 |
| Ammonium sulfate | 4400.00 | 20.00 |

Each of the solid components when added is thoroughly mixed until it is dissolved. Each gallon of the resulting composition removes 2.97 pounds of barium chloride from waste water. It is particularly useful for heavy duty applications such as removal of barium contained in rinse water from a metal parts heat treat line. In a typical operation, for illustration, a heat treat line may consist of a series of baths such as preheat, hi-heat, and barium salt quench stations and water rinse baths for the parts being processed and also for the fixtures carrying the parts through the line. This wash water becomes contaminated with various chemicals including barium chloride (typically 0.1–1.5% by weight) and must be treated to remove the barium before disposal. For holding purposes, the waste water is pumped into storage tanks and held until treated for removal of toxic components. For a heat treat line running two or three shifts and disposing of the stored rinse water once each week, the capacity of each storage tank conveniently may be 400 gallons. In a typical set-up, two tanks (fiber glass filled thermosetting plastic, 4-foot diameter, open top cylindrical) are used in tandem, one in operation and the other on stand by. The connecting pipe work and valves are inert plastic; the bottom of each tank is an inverted cone shape with a drain at the cone apex, accessible for drainage directly to a 55-gallon drum beneath the tank. A second drain above the cone in the cylindrical section interconnecting the two tanks allows the solid-free treated water in each tank to be decanted from sludge in the respective tank. Each tank is fitted with an electric propeller mixer with a 6–8" impeller rated at several hundred rpm. The procedure for removing barium from the waste water collected in a full tank (at room temperature) is to add 10 gallons of the aqueous composition of Example 1 with stirring for 30 minutes. The stirring is then stopped, and the resulting barium sulfate precipitate is allowed to settle. A clean one-liter sample of the supernatant is then taken, and a small amount of Example 1 composition is added without mixing. Formation of a white precipitate indicates that removal of barium is not complete in which case the remainder of the third 5-gallon lot of Example 1 composition is added with stirring for 30 minutes and the mixture is allowed to settle. In a typical case, the barium ion level of an aliquot of the resulting solid-free wash may be 100 ppm or less. Treatment of the wash water can be repeated, if desired, to reduce the barium level even farther or the wash water can be drained through the side outlet to the sewer and the solid sludge containing barium can be discharged as waste.

An alternative procedure for treating the wash waste and for reading the "zero"-barium end-point is as follows:

Take a 1000-ml. aliquot of wash water to be treated in a beaker. Add Example 1 composition in steps of 1 ml. After each addition, stir vigorously and then allow the precipitate to settle for at least 2 minutes. Without stirring, add the next 1 ml. of the composition. If no white precipitate is formed in the clear supernatant liquid, a sufficient amount of the composition has been added. Note this amount. If white precipitate is formed, stir vigorously and allow to settle again. Add the next 1 ml. of the composition and repeat the above procedure until no more white precipitate is formed. Knowing the volume of waste water to be treated and using the above relationship, the total amount of Example 1 composition needed can be calculated as follows:

Gallons of composition needed =

$$[\text{gallons of wash water to be treated}] \times \left[\frac{\text{ml of Ex. 1 composition added}}{1000 \text{ ml (sample size)}}\right]$$

Illustration:

If a 1000-ml. sample of wash water requires 9 ml. of Example 1 composition and 400 gallons of wash water are to be treated, the amount of Example 1 composition needed is $$\text{Gals. to be added} = [400 \text{ gallons}] \frac{9 \text{ ml.}}{[1000 \text{ ml.}]}$$

$$= 3.6 \text{ gallons}$$

The amount of Example 1 composition necessary is added slowly while the treating tank is agitated. Agitation should be continued for 30 minutes after the addition to assure that all barium chloride has reacted. The agitator is then stopped to allow the precipate to settle to the bottom. The barium sulfate precipitate is disposed as solid waste, and the clear top layer can be discharged into a sewer. Large treating tanks may require several hours to settle. This settling period can be eliminated or reduced by removing the solids with either a centrifuge or filter.

EXAMPLE 2

Low Temperature Storage Stability Test

Stock solutions (parts by weight) are made up as follows:

|  | Stock A | Stock B | Stock C | Stock D | Stock E |
|---|---|---|---|---|---|
| Water | 2000 | 2000 | 2000 | 2000 | 2000 |
| Na$_2$SO$_4$ | — | 503 | — | 503 | — |
| Rust inhibitor: | | | | | |
| NaNO$_2$ | 2.49 | 17.4 | 17.4 | 2.49 | 17.4 |
| Oxidized Petrolatum (ALOX 1843) | 2.49 | 2.49 | — | 2.49 | 2.49 |
| Triethanolamine | 7.47 | — | — | 7.47 | — |
| Borax | — | 7.47 | 7.47 | — | 7.47 |
| Coagulant*, Polyacrylamide polymer (Hercofloc 831-2) | 3.74 | 3.74 | 3.74 | 3.74 | 3.74 |

Can be replaced with any one of Hercofloc ® 847, Nalco ® 7763, 7744-A, and 8800, and Nalcolyte ® 607 and 670.

Stock B, Stock D, and a mixture of equal parts by weight of stocks A and D were cooled in an ice bath (10–15 degrees F.) to 40 degrees F. No apparent precipitation occurred. However, when the solutions were stirred at the same temperature, precipitation occurred immediately. It was determined that with agitation the sodium sulfate contained in these samples began to settle out about 58 degrees F. By the same test, a mixture of 20 parts by weight ammonium sulfate with 80 parts by weight of Stock A was storage stable and did not crystallize out with agitation when the temperature was lowered to 28 degrees F. These results show that the composition according to the invention is stable at freezing temperature whereas comparable sulfate compositions (lacking ammonium sulfate) are not stable even at temperatures well above the freezing point of water.

Low Temperature Storage Recovery (a) Clear Stock D solution (400 g.) in a 500-ml. Erlenmeyer flask, was cooled to 45 degrees F. in an ice bath at which temperature crystallization and settling out took place with stirring. The mixture was allowed to warm to room temperature and a portion of the resulting cloudy solution was added to a 5% aqueous solution of barium chloride. The resulting barium sulfate precipitate was coagulated and settled out but the supernatant liquid was still cloudy.

(b) A 20% by weight solution of ammonium sulfate in Stock A solution was made up and a portion added to a 5% aqueous solution of barium chloride with stirring. The resulting barium sulfate precipitate coagulated and settled out leaving a clear supernatant liquid. The temperature was lowered to 28 degrees F. under agitation and no crystallization was noted.

(c) A second 20% by weight solution of ammonium sulfate in Stock E solution was made up and, when cooled and agitated, did not freeze at 28 degrees F. When warmed to room temperature, the solution was completely clear. When the latter was used to precipitate barium from a 5% aqueous solution of barium chloride, the resuting barium coagulate separated cleanly, and the supernatant liquid was completely clear.

These results show that the solution containing sodium sulfate was unstable at low temperature and, after a single cooling cycle, failed to regain its original clarity. The results also show that compositions of the present invention embodying different rust inhibitor systems are storage stable at low temperature, and have a good regain from low temperature both as to retention of clarity and as to efficiency of separation of barium insolubles.

While the invention is described in detail in the foregoing specification, it will be realized by those skilled in the art that considerable variation can be made in such detail without departing from the spirit and scope of the claims which follow.

I claim:

1. The method of treating barium-toxic waste water comprising the steps of mixing an aqueous composition with the waste water in an amount sufficient to enable prompt settling out of barium as solid phase particulates in the thus treated water and separating the particulates from the water as solid waste, the composition consisting essentially of a non-viscous solution of about 15 to 40% by weight of ammonium sulfate and about 0.0005 to about 0.15% by a water-miscible polyacrylamide polymer agent for coagulation of non-ionic barium, the ammonium sulfate being present in a concentration such that the composition is storage stable at temperatures below 32 degrees F.

2. The method according to claim 1 where the composition contains about 1% by weight of rust preventative.

3. The method according to claim 2 where the rust preventative comprises sodium nitrite.

4. The method according to claim 2 where the rust preventative comprises a soluble borate salt.

* * * * *

UNITED STATES PATENT AND TRADEMARK OFFICE
CERTIFICATE OF CORRECTION

PATENT NO. : 4,491,523
DATED : January 1, 1985
INVENTOR(S) : Robert W. Foreman

It is certified that error appears in the above-identified patent and that said Letters Patent is hereby corrected as shown below:

Column 4, line 49, insert -- * -- before "Can".

Claim 1, line 19, following "by" insert -- weight of --.

Signed and Sealed this

Third Day of September 1985

[SEAL]

Attest:

DONALD J. QUIGG

Attesting Officer     Acting Commissioner of Patents and Trademarks - Designate